US007567588B2

(12) United States Patent
Satoh et al.

(10) Patent No.: US 7,567,588 B2
(45) Date of Patent: Jul. 28, 2009

(54) TRANSMISSION SYSTEM

(75) Inventors: Yasuo Satoh, Sagamihara (JP); Masafumi Yugami, Kasukabe (JP)

(73) Assignee: Victor Company of Japan, Limited, Yokohama (JP)

( * ) Notice: Subject to any disclaimer, the term of this patent is extended or adjusted under 35 U.S.C. 154(b) by 1298 days.

(21) Appl. No.: 10/923,799

(22) Filed: Aug. 24, 2004

(65) Prior Publication Data

US 2005/0047447 A1 Mar. 3, 2005

(30) Foreign Application Priority Data

Aug. 27, 2003 (JP) .......................... P2003-302688

(51) Int. Cl.
*H04J 3/06* (2006.01)

(52) U.S. Cl. ...................................... 370/474; 370/503

(58) Field of Classification Search ................ 370/474, 370/503

See application file for complete search history.

(56) References Cited

U.S. PATENT DOCUMENTS

| | | | | |
|---|---|---|---|---|
| 5,579,391 | A * | 11/1996 | Ihara | 725/143 |
| 5,659,556 | A * | 8/1997 | Denissen et al. | 714/763 |
| 5,796,440 | A * | 8/1998 | Rupinski et al. | 348/476 |
| 5,999,227 | A * | 12/1999 | Doherty et al. | 348/564 |
| 6,008,860 | A * | 12/1999 | Patton et al. | 348/565 |
| 6,275,535 | B1 * | 8/2001 | Bramley et al. | 375/240.25 |
| 6,314,234 | B1 * | 11/2001 | Kawamura et al. | 386/95 |
| 7,336,302 | B2 * | 2/2008 | Kuroiwa | 348/237 |
| 2003/0234892 | A1 * | 12/2003 | Hu et al. | 348/607 |
| 2004/0257453 | A1 * | 12/2004 | Lee et al. | 348/222.1 |
| 2008/0031450 | A1 * | 2/2008 | Yamashita | 714/776 |
| 2008/0309602 | A1 * | 12/2008 | Hwang | 345/89 |

FOREIGN PATENT DOCUMENTS

| | | |
|---|---|---|
| JP | 07-202984 | 8/1995 |
| JP | 2000-209622 | 7/2000 |
| JP | 2003-230135 | 8/2003 |

* cited by examiner

*Primary Examiner*—Andrew Lee
(74) *Attorney, Agent, or Firm*—The Nath Law Group; Jerald L. Meyer; Derek Richmond

(57) ABSTRACT

A transmission system omits blanking signals from vertical and horizontal synchronizing signals for video data while securing synchronized transmission between a transmission side and a reception side. To achieve this, the transmission system transmits first synchronizing data (HV) for identifying vertical synchronization, second synchronizing data (HDp) for identifying and synchronizing an effective video line, pixel data for the effective video line, a required digital audio signal, and auxiliary control data. The transmission system can reduce a transmission capacity, optimize a transmission format for optical wireless transmission, and decrease a transmission speed.

7 Claims, 4 Drawing Sheets

TRANSMISSION SYSTEM

BACKGROUND OF THE INVENTION

1. Field of the Invention

The present invention relates to a transmission system, and particularly, to a transmission system for an audio-video optical wireless transmission apparatus or a wired optical signal transmission apparatus, capable of multiplexing an uncompressed baseband digital HD (high definition) video signal, a digital audio signal, and a digital auxiliary control signal including a video signal format and an audio signal format, serially transmitting the multiplexed signal as an optical signal with an optical wireless transmitter or an optical signal transmission cable, receiving the optical signal, demultiplexing the received signal into the video signal, audio signal, and auxiliary control signal, and regenerating the video and audio signals.

2. Description of Related Art

There are known transmission systems that convert an uncompressed baseband digital HD (high definition) video signal into an optical signal and serially transmit the optical signal. An example of such a system is disclosed in Japanese Unexamined Patent Application Publication No. 2000-209622. A DVI (digital visual interface) standard defines a transmission system for transmitting an uncompressed baseband digital HD video signal through a cable. The DVI standard mainly targets digital video signal transmission with personal computers and is only capable of handling three primary color signals of red(R), green(G), and blue(B). Namely, it requires an audio signal to be transmitted separately. When applied to an AV device, the DVI standard requires the AV device to be connected to an audio cable in addition to a video cable.

To solve the connection problem, there is an HDMI (high-definition multimedia interface) standard developed for the AV field. The HDMI standard can handle a component video signal and can simultaneously transmit an uncompressed audio signal.

FIG. 1 shows a data transmission format employed by the HDMI standard. The HDMI standard transmits a whole video signal 46 that includes blanking periods contained in horizontal and vertical synchronizing signals. Namely, the whole video signal 46 includes an effective video signal area 47 consisting of 720 effective pixels by 480 effective lines and a blanking area 48 consisting of 139 pixels in a horizontal direction and 45 lines in a vertical direction. In the blanking area 48, an audio signal, an auxiliary control signal, and the like are multiplexed and transmitted.

There is another known optical transmission system that transmits compressed video and audio signals. An example thereof is disclosed in Japanese Patent Publication No. 3329927 (the second page). The transmission system disclosed in this publication includes a data transmission apparatus having a transmitter for transmitting supplied video and audio data and a remote receiver for receiving the transmitted data. The transmitter relates the supplied data to preset hierarchical levels and transmits the data by shifting the transmission timing by a predetermined quantity level by level and by overlapping the data. The receiver receives the overlapped data and stores the data in a memory in a hierarchy of compressed data pieces each of a predetermined quantity. Even if a transmission line is disconnected, this related art properly combines the hierarchical data to provide continuous data.

The transmission system of the Japanese Unexamined Patent Application Publication No. 2000-209622 employs, as a data transmission network, a computer network based on IEEE1394 or an asynchronous transfer mode (ATM) network. Namely, this related art is fiber transmission and is inapplicable to space transmission. The DVI standard mentioned above is limited to wired (cable) transmission and needs an audio cable in addition to a video cable when applied to AV devices.

The transmission system of the Japanese Patent Publication No. 3329927 can continue the regeneration of video and audio signals in the event of a transmission line disconnection of a relatively short time by regularly time-compressing K (a real number greater than 1) times as large data as a normal data block to be transmitted without interruption and by intermittently transmitting the compressed data. Namely, to transmit an uncompressed baseband digital HD video signal and a digital audio signal, the related art needs a FIFO whose capacity is K times as large as the normal data block. In addition, the related art needs a transmission clock of, for example, several Gbps that is K times faster than a standard clock. Such a large FIFO and a fast transmission clock are unachievable. If the digital video signal and digital audio signal are compressed according to, for example, MPEG, such a large FIFO and a fast transmission speed will not be needed, and therefore, transmission thereof by the related art will be achievable.

The HDMI standard mentioned above allows a component video signal and an uncompressed audio signal to be simultaneously transmitted. The HDMI standard employs TMDS (transition minimized differential signaling) which is also adopted by the DVI standard. The TMDS employs 3-channel lines to transmit a video signal, an audio signal, and a control signal, as well as blanking signals for vertical and horizontal synchronization. In addition, the TMDS employs a 1-channel line to transmit a clock signal. Namely, the TMDS uses four channels in total to realize high-density, high-speed transmission.

Simply transmitting these signals with the use of an optical wireless transmission apparatus requires four optical wireless transmission lines or an optical multiplexing process. This increases costs and enlarges the apparatus. To realize high-speed transmission with a single light beam and to secure a transmission distance of 10 m or longer as required by the HDMI standard, the power of the light beam must be increased. This also increases costs and enlarges the apparatus.

As explained with reference to FIG. 1, a transmission system employing the HDMI standard entirely transmits horizontal and vertical synchronizing signals including blanking periods. Although the blanking periods are used to transmit audio and control signals, entirely transmitting the blanking periods is wasteful. To secure a transmission distance of 10 m or over in wired transmission, each of the four channels must differentially be driven with two signal lines. Although these signal lines are gathered in a single cable, there is a necessity of conducting troublesome work of wiring them to a display section.

SUMMARY OF THE INVENTION

An object of the present invention is to provide a transmission system capable of transmitting at least a digital HD video signal and a digital audio signal with single light and minimizing the transmission of unnecessary signals.

Another object of the present invention is to provide a transmission system capable of employing an inexpensive compact apparatus to transmit at least a digital HD video signal and a digital audio signal.

In order to accomplish the objects, an aspect of the present invention provides a transmission system for multiplexing and serially transmitting an uncompressed baseband digital video signal, a digital audio signal, and a digital auxiliary signal representative of auxiliary information such as a video format and an audio format. The transmission system includes: a first storing means for storing pixel data for the digital video signal in predetermined units; a second storing means for storing the digital audio signal in predetermined audio sample units in response to a sampling frequency synchronized with a transmission master clock oscillator and managing the stored digital audio signal in predetermined units; a third storing means for storing the digital auxiliary signal; a transmission signal generating means for multiplexing first synchronizing data defined for a vertical synchronizing signal for the digital video signal, second synchronizing data defined for effective line identification for the digital video signal, the digital video signal read from the first storing means, the digital audio signal read from the second storing means, and the digital auxiliary signal read from the third storing means in predetermined order in time series into a transmission signal representative of a plurality of lines; and an output means for serially transmitting the transmission signal provided by the transmission signal generating means.

The transmission signal generating means forms the first of the lines the transmission signal represents by reading the first synchronizing data, reading a predetermined number of bits of the digital auxiliary signal from the third storing means, and multiplexing the read data pieces in time series, forms the second of the lines the transmission signal represents by reading the second synchronizing data, reading a predetermined number of bits of the digital auxiliary signal from the third storing means, and multiplexing the read data pieces in time series, and forms each of the third to a predetermined ordinal number of the lines the transmission signal represents by reading the second synchronizing data, sequentially reading, from the digital audio signal stored in the second storing means, a data segment of L (L is a natural number) that is obtained by dividing a sampled data quantity of M bytes (M is a natural number) of the digital audio signal to be transmitted per field by the number N (N is a natural number) of effective lines covered by the digital video signal, sequentially reading effective pixel data for the line in question from the digital video signal stored in the first storing means, and multiplexing the read data pieces in time series, thereby forming the transmission signal having no blanking signals.

This aspect of the present invention eliminates the transmission of blanking signals with respect to vertical and horizontal synchronizing signals generated for a video signal. To at least secure synchronization between transmission and reception, this aspect transmits the first synchronizing data for vertical synchronization, the second synchronizing data serving as a delimiter signal for identifying and synchronizing each effective video line, pixel data for each effective line, sampled data of a digital audio signal to be transmitted within a field, and digital auxiliary data at least required for the video and audio signals. This aspect is capable of reducing a transmission capacity, optimizing an optical wireless transmission format, and relaxing a transmission speed.

An example of this aspect of the present invention will be explained. The digital video signal to be transmitted is, for example, a 750 p signal involving 768 effective video lines. The audio signal to be transmitted within a field of video component signals involves 2 channels each of 24 bits, a maximum number of processible samples of 420 (=56 bytes×45 lines/(3 bytes×2 channels)), an 8-byte horizontal error correction code based on Reed-Solomon, a horizontal block of 48 lines each of 64 bytes (including an 8-byte ECC), a 3-byte vertical error detection code, and a vertical block of 64 by 3 bytes. Two each of the horizontal and vertical blocks are transmitted in a field. Then, the above-mentioned sample data quantity M will be 6144 bytes (={(56+8) bytes×45 lines +64×3 bytes}×2 blocks). Since the number N of effective digital video lines is 768, the above-mentioned data segment L is 8 (=6144/768).

Accordingly, this aspect of the present invention can optically transmit an uncompressed baseband digital HD video signal of 750 p or 1080 i component video (4:2:2) quality class at about 1.27 Gbps. In contrast, directly optically transmitting a 750 p component video signal containing blanking periods needs a transmission speed of about 1.49 Gbps. This transmission speed reduction achieved by this aspect of the present invention is quite meaningful when considering the present capacity of optical wireless transmission with single light, the application of optical wireless transmission to standard AV devices, and the sure transmission of signals for a distance of 10 m or over. In this way, this aspect of the present invention can secure a sufficient margin without enlarging the scale of electrical circuits for transmission and reception in optical wireless transmission carried out with single light.

According to another aspect of the present invention, the digital video signal is displayed according to a progressive scanning system and the digital audio signal multiplexed in the third to the predetermined ordinal number of the lines the transmission signal represents is sequentially transmitted in the data segments L, each data segment L being derived by halving the sampled data quantity including error correction codes of the digital audio signal to be transmitted per field and by dividing each resultant half by a half of the number of the effective lines.

According to still another aspect of the present invention, the digital video signal is displayed according to an interlace scanning system and the digital audio signal multiplexed in the third to the predetermined ordinal number of the lines the transmission signal represents is transmitted by halving the sampled data quantity including error correction codes of the digital audio signal to be transmitted per field, by dividing each resultant half by a half of the number of effective lines to provide a first-half audio data segment and a second-half audio data segment, and by multiplexing the first- and second-half audio data segments line by line.

According to still another aspect of the present invention, the transmission signal generating means forms the first of the lines the transmission signal represents by reading the first synchronizing data, adding special data to identify an even or odd field, reading the digital auxiliary signal, and multiplexing the read and added data pieces in time series, and forms each of the second and following lines the transmission signal represents by reading the second synchronizing data, adding third auxiliary synchronizing data which is special data, reading the digital auxiliary signal or the digital audio signal and digital video signal, and multiplexing the read and added data pieces in time series.

According to still another aspect of the present invention, the transmission signal generating means pads a data shortage with null data to keep a balance between the sampled data quantity of the digital audio signal to be transmitted per field and the quantity of effective pixel data read for the effective lines covered by the digital video signal.

This aspect fixes a transmittable video signal format to a maximum transmission capacity format. For a video signal of smaller transmission capacity than the maximum capacity, a shortage of video or audio signal is padded with null data. With this, any video signal, if using the same vertical synchronizing signal, is transmittable with the same transmission format without changing the transmission system, and the synchronized regeneration of video and audio signals is guaranteed.

According to still another aspect of the present invention, the transmission signal generating means generates the transmission signal according to a master clock frequency that is calculated from an integer multiple of the sampling frequency of the digital audio signal and the greatest common devisor that satisfies the number of the effective lines covered by the digital video signal.

This aspect calculates the master clock frequency used for transmission processing from an integer multiple of the sampling frequency of an audio signal and the greatest common devisor that satisfies the number of effective lines covered by a digital video signal. This aspect can simplify synchronizing and regenerating processes of the video and audio signals and reduce the sizes of circuits for synchronizing and regenerating the video and audio signals.

According to still another aspect of the present invention, the output means carries out 8-bit/10-bit parallel conversion and then parallel/serial conversion on the transmission signal provided by the transmission signal generating means and serially transmits the converted transmission signal.

The nature, principle and utility of the invention will become more apparent from the following detailed description when read in conjunction with the accompanying drawings.

DETAILED DESCRIPTION OF EMBODIMENTS

Figure 2:
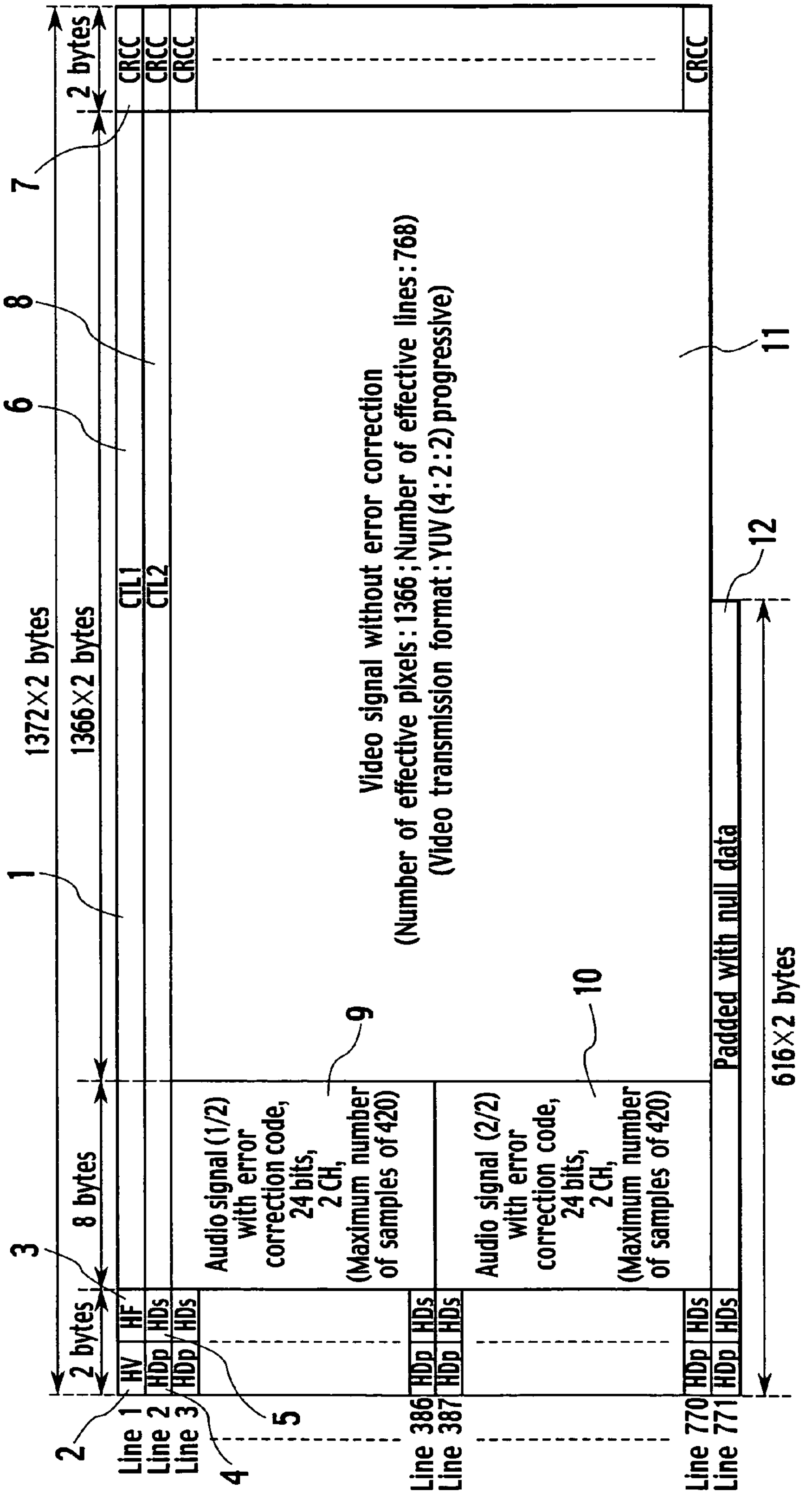
FIG. 2 is a schematic view showing a transmission format according to a first embodiment of the present invention.

Embodiments of the present invention will be explained with reference to the drawings. FIG. 2 shows a signal format according to the first embodiment of the present invention. This format is used in a transmission system according to an embodiment of the present invention. The signal format 1 according to the first embodiment shown in FIG. 2 is used to transmit a 750 p signal that is a typical digital HD video signal based on a progressive scanning system. In the example of FIG. 2, the signal format 1 involves 1366 effective pixels in a horizontal direction and 768 effective lines in a vertical direction.

Namely, this format assumes a vertical synchronizing signal frequency of 59.94 Hz (=60 Hz×1000/1001) and transmits a digital component video signal (4:2:2) multiplexed with audio data. Here, the digital component video signal covers 768 effective video lines each consisting of 1366 effective pixels each represented with a 2-byte data word (16-bit word), and the audio data is of 48 kHz in sampling frequency, 24 bits in level resolution, and 2 ch (L/R) in the number of channels.

The format according to this embodiment assumes that data is handled in 16-bit word units on a transmission side that conducts 8-bit/10-bit parallel/serial conversion and on a reception side that conducts serial/parallel conversion. Serial transmission is carried out at a clock that is 20 times (=16 bits×10B/8B) as fast as a master clock used for writing and reading parallel data to and from a memory.

At the start of transmission of the format, a piece of predefined synchronizing data (HV) 2 and a piece of special data (HF) 3 are always transmitted. These pieces of data may represent characters. The special data (HF) 3 is used to identify an even or odd field.

The first line of the format is used to transmit auxiliary control data (CTL1) 6 related to, for example, an image format. At first, the predefined synchronizing data (HV) 2, i.e., the vertical synchronization identifying character to secure vertical synchronization between the transmission and reception sides is serially transmitted. Next, the predefined special data (HF) 3, i.e., one of the even field character (HFe) and odd field character (HFo) is serially transmitted. Then, the auxiliary control data (CTL1) 6, i.e., 8-bit word string data stored in advance in a memory is read from the memory in 16-bit word units, is subjected to 8B/10B conversion, and is serially transmitted.

At the end of the first line, 16-bit word CRCC data 7 is added. The data 7 is calculated when reading the auxiliary control data (CTL1) 6 from the memory and is used to check a transmission error of the auxiliary control data (CTL1) 6. The data 7 is subjected to 8B/10B conversion and is serially transmitted. The special data (HF) 3 must be alternated between the even field (HFe) and the odd field (HFo) when transmitting an interlace video format signal.

The second line of the format of FIG. 2 is used to transmit auxiliary control data (CTL2) 8 like the first line. At first, predefined synchronizing data (HDp) 4, i.e., an effective line identifying character to secure the synchronization of an effective line between the transmission side and the reception side is serially transmitted. Next, one of two predefined kinds of special data (HDs) 5 is serially transmitted. Thereafter, data like that of the first line is multiplexed in time series. The auxiliary control data in the second line is the same as that in the first line, and therefore, is omissible.

From the third line of the format, an audio signal 9 and a video signal 11 are transmitted. Like the second line, the synchronizing data (HDp) 4 and special data (HDs) 5 are first multiplexed in time series. The audio signal is made at 48 kHz in sampling frequency, 24 bits in level resolution, and 2 ch in the number of channels. The audio signal 9 corresponds to a first half block of audio data to be transmitted within a field, and an audio signal 10 corresponds to a second half block of the audio data. Eight bytes of the audio signal 9 are multiplexed in time series in the third line of the format. Thereafter, 1366 effective pixels (each made of two bytes, i.e., one 16-bit word) of the digital component video signal (YUV (4:2:2)) are multiplexed. Then, a 2-byte CRCC 7 for detecting a data transmission error is multiplexed. The CRCC 7 is calculated when reading the audio signal and video signal. The CRCC calculation may be based on the video signal only.

Like the third line, each of 383 lines from the fourth line to the 386th line multiplexes the audio signal 9 and video signal 11. Like the third to 386th lines, each of 384 lines from the 387th line to the 770th line multiplexes eight bytes of the audio signal 10 and "1366×2" bytes of the video signal 11 in time series. As mentioned above, the audio signal 10 to be transmitted in the 387th to 770th lines is the second half block of the field audio data of 48 kHz in sampling frequency, 24 bits in level resolution, and 2 ch in the number of channels.

An error correction code is calculated for each audio signal block before transmission. The reception side of the audio signal carries out an error correction process only after receiving the audio signal block. Due to this, a delay is unavoidable in signal regeneration. In consideration of an error correction capacity, the size of each audio signal block must not be too small.

Accordingly, the first embodiment of the present invention halves an audio signal to be transmitted within a field into the first half block 9 and second half block 10, to restrict the regeneration delay within two fields. To keep a balance between the audio signal and the video signal, a surplus area may be formed in the audio signal transmission blocks 9 and 10. Such a surplus area is padded with null data.

The last 771st line is to transmit redundant data to be caused when, for simplifying the synchronization and regeneration of video and audio signals, a master clock frequency for transmission processing is selected to be an integer multiple of the audio signal sampling frequency and the greatest common devisor satisfying the number of effective video signal lines. Accordingly, the 771st line is an invalid data area of "616×2" bytes including the synchronizing data (HDp) 4, the special data (HDs) 5, and the redundant data area padded with null data. The null data has no CRCC.

The audio signal transmission format of this embodiment is based on the sampling frequency of 48 kHz, the level resolution of 24 bits, and the number of channels of two (L/R). The level resolution may be changed to 16 bits to transmit an audio signal of three channels (L/R/Center) at the sampling frequency of 48 kHz without changing the transmission signal format.

The transmission signal format of FIG. 2 employs a minimum unit of 8 bits (1 byte). If the transmission signal is an optical signal, one byte is converted into ten bits as will be described later. Accordingly, the synchronizing data (HV) 2, special data (HF) 3, synchronizing data (HDp) 4, and special data (HDs) 5 which are each one byte in FIG. 2 are each converted into ten bits before transmission. Similarly, each byte of the video and audio signals is converted into ten bits.

The conversion from one byte into ten bits is 8B/10B (8-bit/10-bit) conversion, which is a widely known technique to avoid a reception DC offset in transmission signal quality. According to the 8B/10B conversion, eight bits constitute 256 combinations and ten bits constitute 1024 combinations. The 256 combinations of eight bits are related to 256 combinations among the 1024 combinations of ten bits when converting one byte into ten bits. The 1024 combinations of ten bits excluding the 256 combinations are used to define several special characters and a reception self-clock generating character to stabilize reception.

Figure 3:
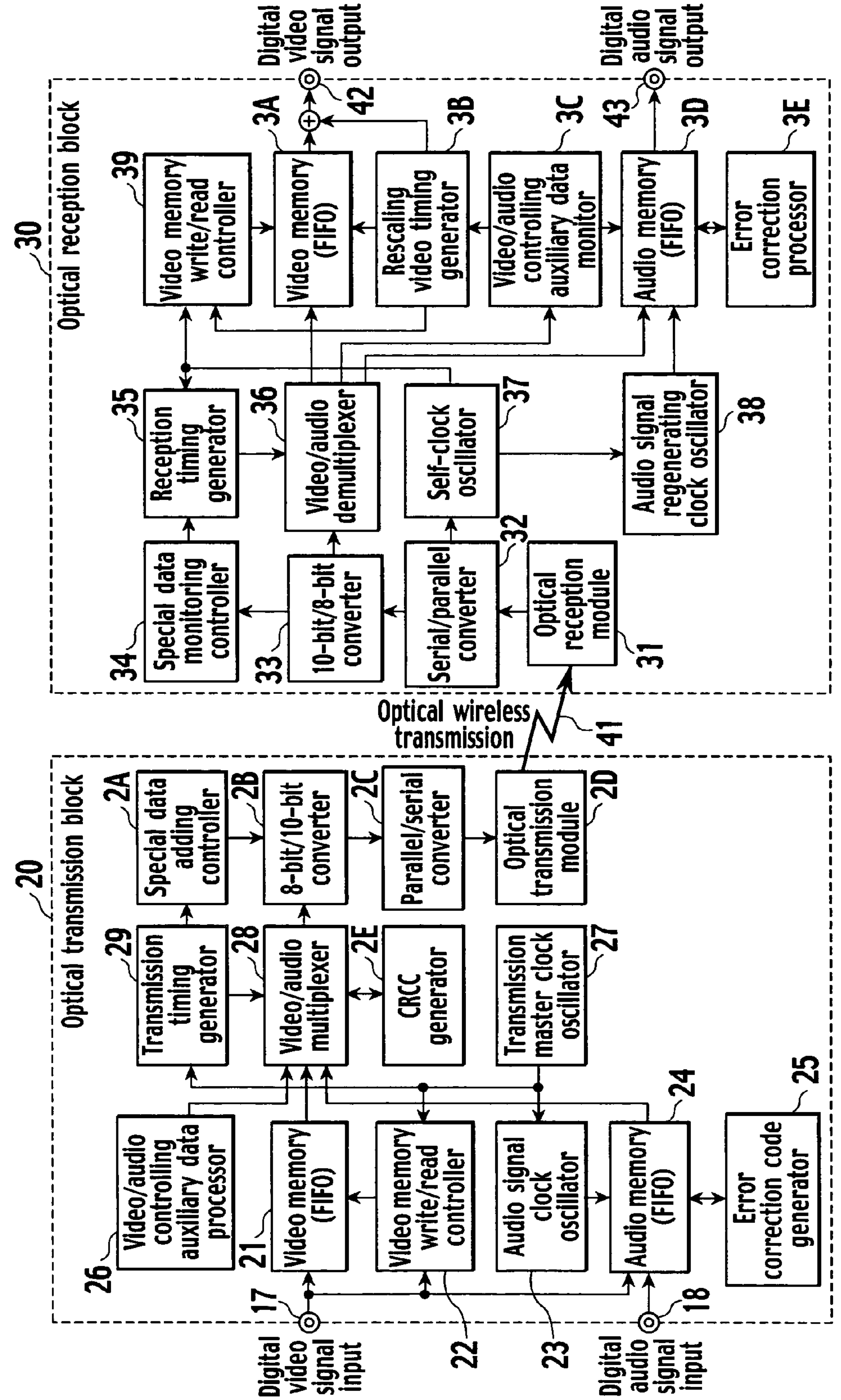
FIG. 3 is a schematic view showing a transmission system according to an embodiment of the present invention.

To transmit and receive signals in the above-mentioned format, a transmission system according to an embodiment of the present invention will be explained with reference to FIG. 3. This transmission system includes an optical transmission block 20 to receive a digital video signal and a digital audio signal, generate, based on the received signals, an optical signal in the format of FIG. 2, and optically wirelessly transmit the optical signal. The system also includes an optical reception block 30 to receive the transmitted optical signal in the format of FIG. 2 and regenerate the original digital video and audio signals.

The transmission system of this embodiment can transmit and receive the 750 p signal, i.e., an uncompressed baseband digital video signal based on a progressive scanning system together with an audio signal in the format of FIG. 2, or a 1080 i signal, i.e., an uncompressed baseband digital signal based on an interlace scanning system together with an audio signal in a format of FIG. 4 (to be explained later). Which of the progressive scanning system and interlace scanning system is employed is determined in advance in the transmission system according to display specifications. Alternatively, switching information or video processing information indicative of the progressive scanning system or the interlace scanning system may be embedded by the system in the auxiliary control signal (CTL1, CTL2) to be transmitted.

Operation of the system of FIG. 3 to transmit and receive signals in the format of FIG. 2 will be explained. An input terminal 17 receives an uncompressed baseband digital component video signal (YUV (4:2:2)) in eight bits in parallel in response to a vertical synchronizing signal of 59.94 Hz. The received digital component video signal covers 768 effective lines each consisting of 1366 effective pixels each consisting of a 2-byte data word (16-bit word). The received digital component video signal is supplied to a FIFO (first-in first-out) video memory 21, a video memory write/read controller 22, and an audio memory 24. In response to a control signal from the video memory write/read controller 22, the supplied signal is written in the video memory 21 line by line.

An input terminal 18 receives a digital audio signal of 48 kHz in sampling frequency, 24 bits in level resolution, and 2 (L/R) in the number of channels. The received audio signal is supplied to a FIFO audio memory 24 in 24 bits in parallel and is sequentially written in the audio memory 24 in synchronization with an audio signal sampling frequency provided by an audio signal clock oscillator 23 synchronized with a transmission master clock oscillator 27.

More precisely, a digital audio signal for a digital video signal of a given field received through the input terminal 17 is divided into two blocks (9 and 10 shown in FIG. 2), and sampled data of the digital audio signal is written in the audio memory 24 block by block. The digital audio signal stored in the audio memory 24 is read block by block, and the read data is supplied to an error correction code generator 25, which generates a transmission error detection code and an error correction code. These codes are written in the audio memory 24.

When transmitting the first line on an optical signal, the synchronizing data (HV) 2 of FIG. 2, i.e., the vertical synchronization identifying character to secure vertical synchronization between the transmission and reception sides and the special data (HF) 3 of FIG. 2, i.e., one of the even (HFe) and odd (HFo) field identifying characters are provided from a special data adding controller 2A and are converted by an 8-bit/10-bit converter 2B into 10-bit parallel data. This parallel data is converted by a parallel/serial converter 2C into serial data, which is converted by an optical transmission module 2D into an optical signal. The optical signal is sent to an optical wireless transmission path 41.

Then, the auxiliary control data (CTL1), which is 8-bit word string data stored in advance in a video/audio controlling auxiliary data processor 26, is read 16-bit word by 16-bit word. The read 16-bit word is supplied in parallel to the 8-bit/10-bit converter 2B through a video/audio multiplexer 28. The converter 2B converts the 16-bit word into 20-bit parallel data, which is converted by the parallel/serial converter 2C into serial data. The serial data is converted by the optical transmission module 2D into an optical signal, which is transmitted to the optical wireless transmission path 41 as indicated with "6" in FIG. 2 (although FIG. 2 shows the serial data before the 8-bit/10-bit conversion).

Based on the auxiliary data (CTL1) of "1366×2" bytes supplied to the video/audio multiplexer 28, a CRCC generator 2E generates a 2-byte transmission error correction code CRCC, which is supplied to the video/audio multiplexer 28. The CRCC is read from the video/audio multiplexer 28 16-bit by 16-bit. The read CRCC is processed through the 8-bit/10-bit converter 2B and parallel/serial converter 2C and is sent to the optical transmission module 2D, which converts the CRCC into an optical signal. The optical signal is transmitted to the optical wireless transmission path 41 at the end of the first line as indicated with "7" in FIG. 2 (although FIG. 2 shows the serial data before the 8-bit/10-bit conversion). The CRCC 7 is a transmission error checking code that completes every line.

Similar to the first line, the second line is transmitted as an optical signal to the optical wireless transmission path 41. From the third line, the audio signal 9 and video signal 11 are transmitted. The start of the third line resembles the start of the second line. Namely, the special data adding controller 2A sequentially provides the synchronizing data (HDP) 4 and special data (HDs) 5, which are serially transmitted through the above-mentioned route. Audio data for the third line with an error correction code is time-compressed and is read in 16-bit words from a given area of the audio memory 24. The read audio data is passed through the video/audio multiplexer 28 and is supplied in parallel to the 8-bit/10-bit converter 2B, which converts the supplied data into parallel data in 20-bit word units. The 20-bit word parallel data is converted by the parallel/serial converter 2C into serial data, which is converted by the optical transmission module 2D into an optical signal. The optical signal is transmitted to the optical wireless transmission path 41 as indicated with "9" in FIG. 2 (although FIG. 2 shows the serial data before the 8-bit/10-bit conversion).

Based on a read clock from the video memory write/read controller 22, video signal data for the third line is time-expanded and read from the video memory 21 in 16-bit units (pixel by pixel). The read data is passed through the video/audio multiplexer 28 to the 8-bit/10-bit converter 2B, which converts 16-bit pixel data into 20-bit parallel data. The parallel data is converted by the parallel/serial converter 2C into serial data, which is converted by the optical transmission module 2D into an optical signal. The optical signal is transmitted to the optical wireless transmission path 41 as indicated with "11" in FIG. 2 (although FIG. 2 shows the serial data before the 8-bit/10-bit conversion).

When reading the audio and video data, the CRCC generator 2E calculates a transmission error checking CRCC of 16-bit word for a transmission data string of "4×2"-byte audio data and "1366×2"-byte video data. This CRCC is supplied at the end of the third line to the optical transmission module 2D through the above-mentioned route and is converted into an optical signal. The optical signal is serially transmitted to the optical wireless transmission path 41 as indicated with "7" in FIG. 2 (although FIG. 2 shows the serial data before the 8-bit/10-bit conversion).

Each of the fourth to 770th lines is prepared like the third line, and an optical signal similar to that of the third line is wirelessly transmitted. In the last 771st line, the synchronizing data (HDp) converted into 10-bit data and the special data (HDs) converted into 10-bit data are wirelessly transmitted in time series. Thereafter, surplus data to keep a balance between the audio signal blocks 9 and 10 and the video signal 11 is padded with null data, and the null data of "616×2" bytes thus formed is serially transmitted to the optical wireless transmission path 41 as indicated with "12" in FIG. 2. A transmission timing generator 29 controls, according to the transmission format, which of the padded null data and the effective data must be sent.

Operation of the optical reception block 30 of FIG. 3 will be explained. Based on a vertical synchronization identifying trigger signal (the first synchronizing data (HV) 2), the optical reception block 30 temporarily stores the serially transmitted digital video signal and digital audio signal in exclusive memories 3A and 3D, respectively. The audio signal is subjected to predetermined signal processes such as an error correction and is sequentially read out of the audio memory 3D according to an audio signal regenerating clock, which is generated according to sampling frequency information of the transmission side obtained from the digital auxiliary control data. The read audio signal is time-expanded and is regenerated at sampling intervals. The number of samples of the audio signal to be regenerated is based on sample number information transmitted in the same block. The audio samples are continuously regenerated to realize synchronization with video data.

According to a transmitted vertical synchronization identifying trigger signal, the video signal is vertically synchronized with a resealing clock. According to the video format specified by the digital auxiliary control data, vertical and horizontal synchronizing signals including blanking periods are added, and pixel data for each effective line is sequentially read from the video memory 3A in a time compressing manner. The read pixel data is rescaled and thus synchronously regenerated, to thereby solve the problems of the related art.

Namely, the optical signal of the format shown in FIG. 2 transmitted through the optical wireless transmission path 41 is received by an optical reception module 31 in the optical reception block 30. The optical reception module 31 photoelectrically converts the received optical signal, and the converted data is converted by a serial/parallel converter 32 into parallel data. The parallel data is supplied to a 10-bit/8-bit converter 33 that converts 10 input bits into 8 output bits.

A special data monitoring controller 34 monitors the synchronizing data (HV) that is a vertical synchronization identifying trigger signal attached at the start of the received signal. After detecting the synchronizing data (HV), the next special data (HF) is used to identify an even field or an odd field. The identified result is used to control a reception timing signal provided by a reception timing generator 35. In the data provided by the serial/parallel converter 32, the synchronizing data HDp serves as a delimiter signal assigned as a predetermined synchronizing data to identify and synchronize an effective video line. According to the synchronizing data HDp, a self-clock oscillator 37 generates a self-clock, which is supplied to the reception timing generator 35 and a video memory write/read controller 39. The synchronizing data HDp is regularly sent for each effective line, and therefore, provides a self-clock correction function on the reception side.

The received signal converted by the 10-bit/8-bit converter 33 from 10 bits into 8 bits is supplied to a video/audio demultiplexer 36 in parallel in 16-bit words. Based on the reception timing signal from the reception timing generator 35, the video/audio demultiplexer 36 demultiplexes the received signal into video signal data, audio signal data, and auxiliary control data. The video signal data is supplied to the FIFO video memory 3A, the audio signal data to the FIFO audio memory 3D, and the auxiliary control data to a video/audio controlling auxiliary data monitor 3C.

The audio signal data of one field stored in the audio memory 3D is divided into two blocks. The audio signal data is read from the audio memory 3D block by block and is supplied to an error correction processor 3E that conducts an error correction process according to an error detection code and an error correction code. The corrected audio signal data is rewritten in the audio memory 3D.

Based on the self-clock oscillator 37 on the reception side that is in synchronization with the transmission master clock oscillator 27 on the transmission side, an audio signal regenerating clock oscillator 38 generates a regenerating clock signal synchronized with the transmission sampling frequency. According to this clock signal and the number of transmission channels, the number of sampled effective bits, and the like contained in the received auxiliary control signals CTLL and CTL2 provided by the video/audio controlling auxiliary data monitor 3C, an error corrected regenerated audio signal is read from the audio memory 3D in a time-expanding manner to restore an original time axis at sampling intervals. The read data is supplied to a digital audio signal output terminal 43.

According to the received auxiliary control signals CTL1 and CTL2 from the video/audio controlling auxiliary data monitor 3C, a resealing video timing generator 3B provides the video format, display setting information, and the like to set and control a regeneration and display side. According to the information from the resealing video timing generator 3B, the video memory write/read controller 39 controls write and read operations on the video memory 3A.

Figure 1:
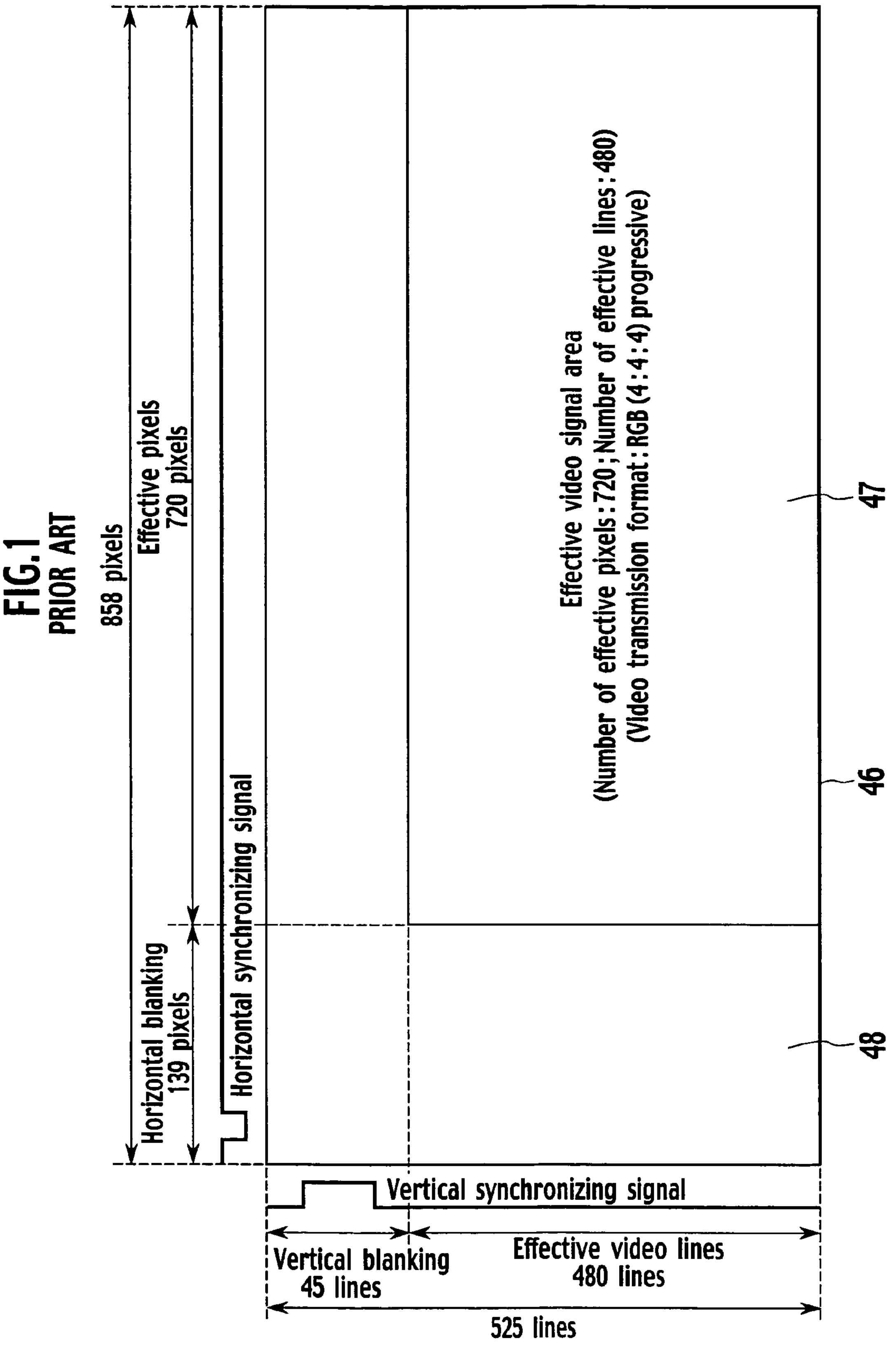
FIG.1 PRIOR ART
FIG. 1 is a schematic view showing an example of a data transmission format used by a transmission system according to a related art.

A standard video signal like the one shown in FIG. 1 is input and output in a unique format including blanking periods and is transferred as it is to a display which displays the video signal. The embodiment of the present invention, however, employs the transmission format of FIG. 2 that includes no blanking periods and transmits a video signal by compressing the same along a time axis to reduce a transmission capacity. Accordingly, a final output signal to a display (not shown) according to the embodiment needs the addition of blanking periods to received video data and the expanding of the received video data along a time axis. To achieve this, the resealing video timing generator 3B carries out a resealing operation to provide vertical and horizontal synchronizing signals containing blanking signals for the received video signal data and expand the time axis of the received video signal data.

In this way, the resealing video timing generator 3B provides vertical and horizontal synchronizing signals having blanking signals. At this time, pixel data for an effective line is read line by line from the video memory 3A along a time axis of the display with each pixel represented with 16 bits. Based on a read clock provided by the video memory write/read controller 39, the vertical and horizontal synchronizing signals are combined with the read pixel data, and the combined data is supplied to a digital video signal output terminal 42.

In this way, this embodiment eliminates the transmission of synchronizing blanking periods, although there is a need of padding a redundant transmission period with null data. Namely, the embodiment minimizes the transmission of unnecessary signals. The embodiment transmits pixel data only for effective video signal lines and multiplexes the pixel data with an audio signal. As a result, the embodiment can optically transmit a 750 p component video (4:2:2) class uncompressed baseband digital HD video signal at about 1.27 Gbps.

Optically transmitting a standard 750 p component video signal containing blanking periods needs a transmission speed of about 1.49 Gbps. This transmission speed reduction achieved by the embodiment is quite meaningful when considering the present capacity of optical wireless transmission with single light, the application of optical wireless transmission to standard AV devices, and the sure transmission of signals for a distance of 10 m or over. Accordingly, the embodiment can secure a sufficient margin in optical wireless transmission carried out with single light.

The embodiment calculates a master clock frequency from an integer multiple of the sampling frequency of a digital audio signal and the greatest common devisor that satisfies the number of effective lines covered by a digital video signal. This can simplify synchronizing and regenerating processes of the video and audio signals and reduce the sizes of circuits for synchronizing and regenerating the video and audio signals.

The embodiment may fix a transmittable video signal format to a maximum transmission capacity format. For a video signal of smaller transmission capacity than the maximum capacity, a shortage of video or audio signal is padded with null data. With this, any video signal, if using the same vertical synchronizing signal, is transmittable with the same transmission format without changing the transmission system, and the synchronized regeneration of video and audio signals is guaranteed. The embodiment can fully cover digital HD video signals below 750 p, for example, 720 p and 480 p.

Next, the second embodiment of the present invention will be explained. The second embodiment relates to transmitting a 1080 i signal that is a typical digital HD video signal based on the interlace scanning system. FIG. 4 shows a signal format transmitted according to a transmission system of the second embodiment. The same parts as those shown in FIG. 2 are represented with like reference marks.

Figure 4:
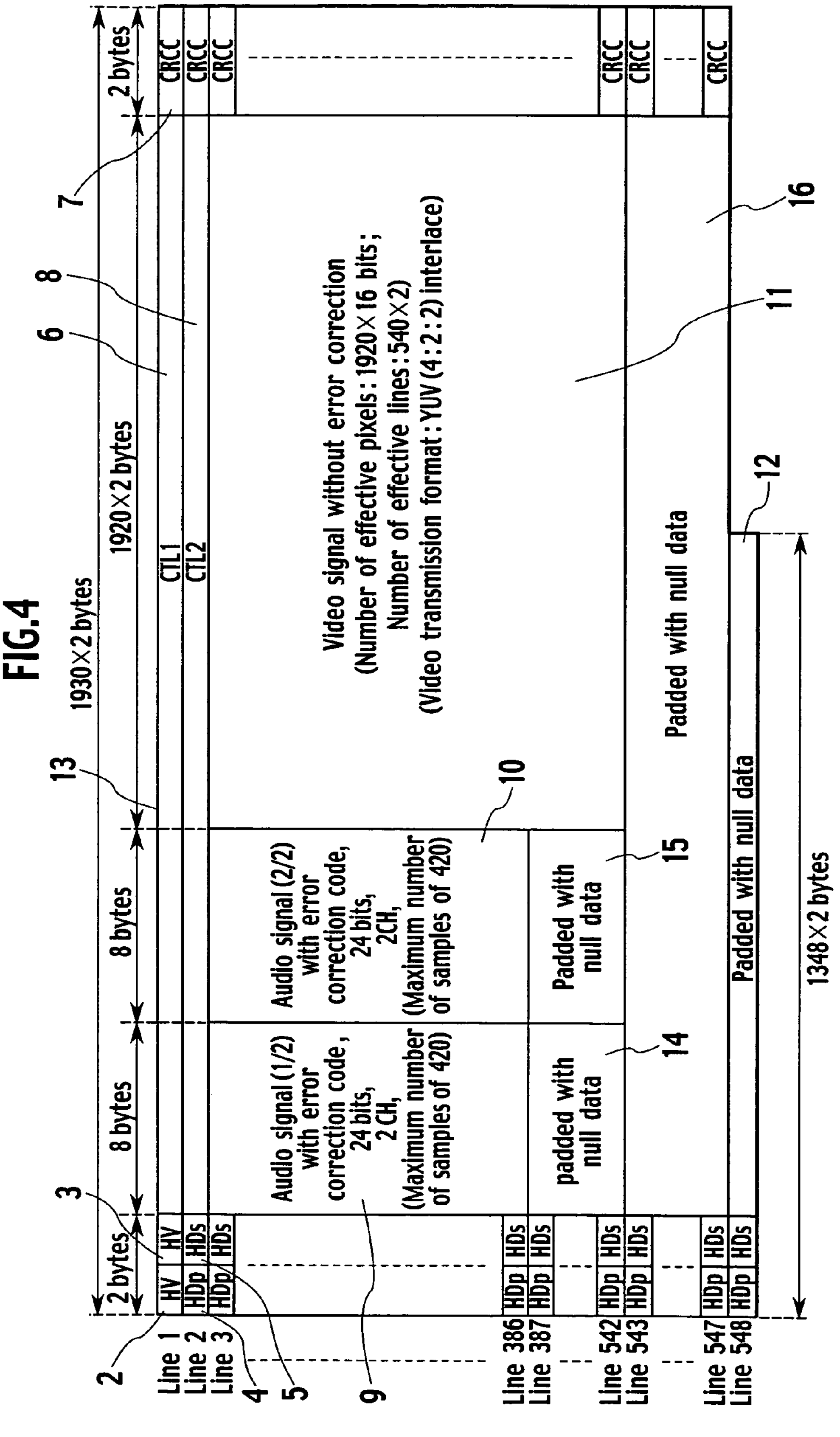
FIG. 4 is a schematic view showing a transmission format according to a second embodiment of the present invention.

In FIG. 4, the signal format 13 is used to transmit a 1080 i video signal. The signal format 13 assumes a vertical synchronizing signal of 59.94 Hz (60 Hz×1000/1001). The signal format 13 transmits a digital component video signal (4:2:2) involving "540×2" effective video lines and 1920 effective pixels per effective line with each pixel consisting of a two-byte data word (16-bit word). With this video signal, the format 13 multiplexes audio data of 48 kHz in sampling frequency, 24 bits in level resolution, and 2 (L/R) in the number of channels.

Like the first embodiment, the second embodiment carries out 8-bit/10-bit, parallel/serial conversion on a transmission side and 10-bit/8-bit, serial/parallel conversion on a reception side. These conversion operations are carried out in 16-bit word units. Serial transmission is carried out at a clock 20 times (=16 bits×10B/8B) as large as a master clock used to write and read parallel data to and from a memory.

A total transmission capacity of the second embodiment is smaller than that of the first embodiment. Therefore, excess transmission parts are padded with null data as indicated with "14" and "15" in the signal format 13 of FIG. 4. As a result, the format 13 of the second embodiment realizes the same total transmission capacity as that of the first embodiment and can complete the transmission of pixel data necessary for one line within one line. The format of the second embodiment is also compatible to that of the first embodiment in conducting the block-by-block transmission of an audio signal with error correction codes.

In FIG. 4, the first line arranges, like the first embodiment, synchronizing data (HV) 2, i.e., a vertical synchronization identifying character, special data (HF) 3, auxiliary control data (CTL1) 6 such as an image format, and a transmission error checking CRCC 7. The CRCC 7 is 16-bit word data and is calculated when the corresponding auxiliary control data is read. These pieces of data are subjected to 8-bit/10-bit (8B/10B) conversion and are serially transmitted.

The second embodiment handles an interlace video signal. Namely, the signal format of FIG. 4 is used to transmit a 1080 i signal and an audio signal field by field. According to transmission image information, the special data (HF) 3 alternates an even field (HFe) and an odd field (HFo). Similar to the first line, the second line serially transmits auxiliary control data (CTL2) 8.

From the third line, an audio signal block (1/2) 9, an audio signal block (2/2) 10, and video signal data 11 are transmitted. Unlike the first embodiment, the video format of the second embodiment transmits 540 effective lines per field. Due to this, it is impossible for the second embodiment to continuously transmit the two audio signal blocks in an effective line direction (vertical direction) like the first embodiment. Accordingly, the format of the second embodiment transmits the two audio signal blocks in an effective pixel direction (horizontal direction).

Like the second line, the third line first arranges synchronizing data (HDp) 4 and special word special data (HDs) 5. Thereafter, 8 bytes of the audio signal block (1/2) provided with an error correction signal are read in 16-bit word units in a time compressing manner from a predetermined data area of an audio signal memory (FIFO). The read 8 bytes are subjected to 8B/10B conversion and are serially transmitted. Similarly, 8 bytes of the audio signal block (2/2) provided with an error correction code are transmitted.

Thereafter, "1920×2" bytes of the video signal are read in pixel data units in a time expanding manner from a video signal memory (FIFO). The read data is subjected to 8B/10B conversion and is serially transmitted. When the audio signal and video signal are read, a transmission error checking CRCC 7 of two bytes (16-bit word) is calculated for the transmission data string. These two bytes are subjected to 8B/10B conversion and are serially transmitted. The CRCC may be calculated only for the video signal.

Each line up to the 386th line is processed like the third line. Thereafter, each of 156 lines from the 387th line to the 542nd line involves an audio signal padded with null data 14 of 8 bytes and null data 15 of 8 bytes and the video signal data 11 of "1920×2" bytes. These pieces of data are subjected to 8B/10B conversion and are serially transmitted.

The second embodiment is unable to separately transmit the audio signal blocks 9 and 10 in one field, and therefore, tries to keep a regeneration delay between transmission and reception within 3 fields. To keep a balance between audio signal transmission and video signal transmission, the excess data transmission areas in the audio signal transmission blocks 9 and 10 are padded with null data like the first embodiment.

The 543rd to 547th lines correspond to a difference between the total transmission capacity of the first embodiment and an effective transmission capacity of the second embodiment and form an unnecessary data area. As indicated with "16" in FIG. 4, the audio signal and video signal in this unnecessary data area are padded with null data, are subjected to 8B/10B conversion, and are serially transmitted. Since calculation data for CRCC 7 has no significance, it may be omitted.

The last 548th line transmits null data 12 due to the same reason as that of the first embodiment. Namely, to simplify the synchronized regeneration process of video and audio signals, a master clock frequency for transmission processing is calculated from an integer multiple of an audio signal sampling frequency and the greatest common devisor satisfying the number of effective video signal transmission lines. This results in causing the null data 12. Namely, the 548th line is an invalid data area, and therefore, synchronizing data (HDp) 4 and special word special data (HDs) 5 are serially transmitted in the line. Then, the excess data transmission area is padded with null data, is subjected to 8B/10B conversion, and is serially transmitted. No CRCC data is added.

Like the first embodiment, the audio signal may be changed to 48 kHz in sampling frequency and 16 bits in level resolution, to transmit a 3-channel (L/R/Center) signal without changing the transmission format.

Although involving an excess transmission section that must be padded with null data, the second embodiment minimizes the transmission of unnecessary signals by omitting blanking periods and by multiplexing pixel data of only effective video lines with audio data. Consequently, the second embodiment can optically transmit an uncompressed baseband digital HD signal of 1080 i component video (4:2:2) quality class at about 1.27 Gbps.

The present invention is not limited to the embodiments mentioned above. For example, the optical transmission module 2D and optical reception module 31 shown in FIG. 3 may be replaced with optical fiber transmission and reception driver/receivers, to realize optical fiber transmission. The predetermined special data 5 is added after the synchronizing data HDp, to provide a key information switching signal used for a transmission data scrambling process to secure copyright.

It should be understood that many modifications and adaptations of the invention will become apparent to those skilled in the art and it is intended to encompass such obvious modifications and changes in the scope of the claims appended hereto.

What is claimed is:

1. A transmission system for multiplexing and serially transmitting an uncompressed baseband digital video signal, a digital audio signal, and a digital auxiliary signal representative of auxiliary information such as a video format and an audio format, comprising:

a first storing means for storing pixel data for the digital video signal in predetermined units;

a second storing means for storing the digital audio signal in predetermined audio sample units in response to a sampling frequency synchronized with a transmission master clock oscillator and managing the stored digital audio signal in predetermined units;

a third storing means for storing the digital auxiliary signal;

a transmission signal generating means for multiplexing first synchronizing data defined for a vertical synchronizing signal for the digital video signal, second synchronizing data defined for effective line identification for the digital video signal, the digital video signal read from the first storing means, the digital audio signal read from the second storing means, and the digital auxiliary signal read from the third storing means in predetermined order in time series into a transmission signal representative of a plurality of lines; and an output means for serially transmitting the transmission signal provided by the transmission signal generating means, the transmission signal generating means forming the first of the lines the transmission signal represents by reading the first synchronizing data, reading a predetermined number of bits of the digital auxiliary signal from the third storing means, and multiplexing the read data pieces in time series, forming the second of the lines the transmission signal represents by reading the second synchronizing data, reading a predetermined number of bits of the digital auxiliary signal from the third storing means, and multiplexing the read data pieces in time series, and forming each of the third to a predetermined ordinal number of the lines the transmission signal represents by reading the second synchronizing data, sequentially reading, from the digital audio signal stored in the second storing means, a data segment of L (L is a natural number) that is obtained by dividing a sampled data quantity of M bytes (M is a natural number) of the digital audio signal to be transmitted per field by the number N (N is a natural number) of effective lines covered by the digital video signal, sequentially reading effective pixel data for the line in question from the digital video signal stored in the first storing means, and multiplexing the read data pieces in time series, thereby forming the transmission signal having no blanking signals.

2. The transmission system of claim 1, wherein:

the digital video signal is a video signal to be displayed according to a progressive scanning system; and the digital audio signal multiplexed in the third to the predetermined ordinal number of the lines the transmission signal represents is sequentially transmitted in the data segments L, each data segment L being derived by halving the sampled data quantity including error correction codes of the digital audio signal to be transmitted per field and by dividing each resultant half by a half of the number of the effective lines.

3. The transmission system of claim 1, wherein:

the digital video signal is displayed according to an interlace scanning system; and the digital audio signal multiplexed in the third to the predetermined ordinal number of the lines the transmission signal represents is transmitted by halving the sampled data quantity including error correction codes of the digital audio signal to be transmitted per field, by dividing each resultant half by a half of the number of effective lines to provide a first-half audio data segment and a second-half audio data segment, and by multiplexing the first- and second-half audio data segments line by line.

4. The transmission system of claim 1, wherein:

the transmission signal generating means forms the first of the lines the transmission signal represents by reading the first synchronizing data, adding special data to identify an even or odd field, reading the digital auxiliary signal, and multiplexing the read and added data pieces in time series, and forms each of the second and following lines the transmission signal represents by reading the second synchronizing data, adding third auxiliary synchronizing data which is special data, reading the digital auxiliary signal or the digital audio signal and digital video signal, and multiplexing the read and added data pieces in time series.

5. The transmission system of claim 1, wherein:

the transmission signal generating means pads a data shortage with null data to keep a balance between the sampled data quantity of the digital audio signal to be transmitted per field and the quantity of effective pixel data read for the effective lines covered by the digital video signal.

6. The transmission system of claim 1, wherein:

the transmission signal generating means generates the transmission signal according to a master clock frequency that is calculated from an integer multiple of the sampling frequency of the digital audio signal and the greatest common devisor that satisfies the number of the effective lines covered by the digital video signal.

7. The transmission system of claim 1, wherein:

the output means carries out 8-bit/10-bit parallel conversion and then parallel/serial conversion on the transmission signal provided by the transmission signal generating means and serially transmits the converted transmission signal.

* * * * *